US010381631B2

(12) United States Patent
Kagami et al.

(10) Patent No.: US 10,381,631 B2
(45) Date of Patent: Aug. 13, 2019

(54) SEALED-TYPE BATTERY HAVING A CURRENT INTERRUPT DEVICE

(71) Applicant: TOYOTA JIDOSHA KABUSHIKI KAISHA, Toyota-shi, Aichi-ken (JP)

(72) Inventors: Naoto Kagami, Toyota (JP); Tomohiro Ono, Miyoshi (JP); Tomotaka Hagino, Toyota (JP); Yoichi Naruse, Nagoya (JP); Yuta Nemoto, Okazaki (JP); Toshinori Okura, Toyota (JP); Kaito Matsubara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/814,753

(22) Filed: Nov. 16, 2017

(65) Prior Publication Data
US 2018/0145307 A1    May 24, 2018

(30) Foreign Application Priority Data
Nov. 21, 2016   (JP) .................. 2016-225912

(51) Int. Cl.
*H01M 2/34* (2006.01)
*H01M 2/06* (2006.01)
(Continued)

(52) U.S. Cl.
CPC ............ *H01M 2/345* (2013.01); *H01M 2/06* (2013.01); *H01M 2/1229* (2013.01); *H01M 2/30* (2013.01); *H01M 2/305* (2013.01); *H01M 10/0431* (2013.01); *H01M 2/08* (2013.01); *H01M 2/263* (2013.01); *H01M 10/0525* (2013.01); *H01M 2200/20* (2013.01); *H01M 2220/20* (2013.01)

(58) Field of Classification Search
CPC .. H01M 2/345; H01M 2/305; H01M 10/0431; H01M 2/1229; H01M 2/30; H01M 2/06; H01M 2200/20; H01M 2/263; H01M 2/08; H01M 10/0525
USPC .......................................................... 429/61
See application file for complete search history.

(56) References Cited

U.S. PATENT DOCUMENTS

2016/0233562 A1*  8/2016  Nakayama .............. H01M 2/30

FOREIGN PATENT DOCUMENTS

| CN | 205621794 U | 10/2016 |
|---|---|---|
| JP | 2014-139904 A | 7/2014 |

(Continued)

*Primary Examiner* — Gary D Harris
(74) *Attorney, Agent, or Firm* — Sughrue Mion, PLLC

(57) ABSTRACT

A sealed-type battery includes an exterior body, a collector terminal, a hollow rivet defining a hollow section, and a reverse plate arranged between the collector terminal and the hollow rivet. The collector terminal includes: a projected section projected; a peripheral edge section provided; and a notch section provided in the peripheral edge section in a manner to surround the projected section and formed in a manner to reduce thickness of the collector terminal. In a projected direction of the projected section, the projected section is thicker than the peripheral edge section. A fitting section, to which the projected section is fitted, is provided in the reverse plate. The sealed-type battery includes a welded section that has a top surface opposing the hollow rivet and that joins the collector terminal and the reverse plate at a position between the projected section and the fitting section.

3 Claims, 7 Drawing Sheets

(51) Int. Cl.
*H01M 2/12* (2006.01)
*H01M 2/30* (2006.01)
*H01M 10/04* (2006.01)
H01M 2/08 (2006.01)
H01M 2/26 (2006.01)
H01M 10/0525 (2010.01)

(56) References Cited

FOREIGN PATENT DOCUMENTS

| | | |
|---|---|---|
| JP | 2015-060751 A | 3/2015 |
| JP | 2016-096014 A | 5/2016 |

* cited by examiner

SEALED-TYPE BATTERY HAVING A CURRENT INTERRUPT DEVICE

INCORPORATION BY REFERENCE

The disclosure of Japanese Patent Application No. 2016-225912 filed on Nov. 21, 2016 including the specification, drawings and abstract is incorporated herein by reference in its entirety.

BACKGROUND

1. Technical Field

The disclosure generally relates to a sealed-type battery and, in particular, to a sealed-type battery that includes a current interrupt device (CID).

2. Description of Related Art

In regard to a sealed-type battery of the related art, for example, a secondary battery is disclosed in Japanese Patent Application Publication No. 2015-60751 (JP 2015-60751 A). This secondary battery has such a purpose that actuation of a current interrupt device therein can be recognized from the outside (JP 2015-60751 A).

The secondary battery disclosed in JP 2015-60751 A includes the current interrupt device and a pressure-sensitive member. The current interrupt device has: a connection terminal having an opening on an outer side of the secondary battery; and a reverse plate connected to the connection terminal. The pressure-sensitive member is provided to seal the opening of the connection terminal. A state of the pressure-sensitive member is changed in accordance with an increase in a pressure of a space surrounded by the reverse plate and the connection terminal.

In addition, a secondary battery having a purpose of improving the quality of welding between a diaphragm and a member constituting a current path is disclosed in Japanese Patent Application Publication No. 2016-96014 (JP 2016-96014 A). In this secondary battery, the diaphragm is deformed along with an increase in an internal pressure of a battery container, so as to interrupt the current path between an external terminal and a rolled-electrode group in the battery container (JP 2016-96014 A).

In the secondary battery disclosed in JP 2016-96014 A, the diaphragm is configured such that a portion welded to the member constituting the current path is thicker than a deformation portion to be deformed by the increase in the internal pressure.

Furthermore, a square secondary battery is disclosed in Japanese Patent Application Publication No. 2014-139904 (JP 2014-139904 A). This square secondary battery has a purpose of reliably and stably interrupting a current flow at a time when an internal pressure thereof is increased (JP 2014-139904 A).

The square secondary battery disclosed in JP 2014-139904 A has: a connection terminal inserted through an opening that is opened to a battery lid; a lead arranged in the battery and connected to the connection terminal; and a diaphragm connected to the lead and deformed by an increase in the internal pressure of the battery. The diaphragm is caulked to the lead via a seal member.

SUMMARY

As disclosed in the above-described patent literature, the sealed-type battery that includes the current interrupt device has been known. When an internal pressure of an exterior body, which accommodates a battery element, is increased to be equal to or higher than a specified pressure, the reverse plate is deformed, and the current interrupt device thereby interrupts a current flow between the battery element and the external terminal.

In such a sealed-type battery, a collector terminal connected to the battery element in the exterior body is joined to the reverse plate by welding. At this time, the internal pressure (a reverse pressure) of the exterior body during the deformation of the reverse plate possibly varies due to a welding process of the collector terminal and the reverse plate. In addition, in order to keep high reliability of the sealed-type battery, it is necessary to reduce a chance of entry of a foreign substance into the battery, and an example of the foreign substance is spatter that is produced during welding of the collector terminal and the reverse plate.

In view of the above, the disclosure provides a sealed-type battery that includes a current interrupt device, that suppresses a variation in a reverse pressure of a reverse plate, and that reduces a chance of entry of a foreign substance into the battery.

A sealed-type battery according to the disclosure is a sealed-type battery that includes a current interrupt device. The sealed-type battery includes: an exterior body accommodating a battery element; a collector terminal connected to the battery element in the exterior body; a hollow member defining a hollow section that communicates with outside of the exterior body; a reverse plate arranged between the collector terminal and the hollow member, deformed at a time when an internal pressure of the exterior body is increased to be equal to or higher than a specified pressure, to interrupt a current flow between the battery element and an external terminal provided on the outside of the exterior body; and a welded section having a top surface opposing the hollow member, the welded section joining the collector terminal and the reverse plate at a position between a projected section and a fitting section. The collector terminal includes: the projected section projected toward the hollow member; a peripheral edge section provided along a peripheral edge of the projected section; and a notch section provided in the peripheral edge section in a manner to surround the projected section and formed in a manner to reduce thickness of the collector terminal in a projected direction of the projected section. The projected section is thicker than the peripheral edge section in the projected direction of the projected section. The fitting section, to which the projected section is fitted, is provided in the reverse plate.

According to the sealed-type battery with such a configuration, the collector terminal and the reverse plate are welded to each other in a state where the projected section is fitted to the fitting section. In this way, butt welding of the collector terminal and the reverse plate can be performed at the position between the projected section and the fitting section, and a welding margin of the welded section in a thickness direction of the collector terminal can easily be secured. In addition, displacement of a welded position of the reverse plate with respect to the collector terminal can be prevented. Therefore, variations in a reverse pressure of the reverse plate due to a welding process of the collector terminal and the reverse plate can be suppressed. Furthermore, the welded section has the top surface that opposes the hollow member, and is a portion in which the collector terminal and the reverse plate are welded to each other from the outside of the exterior body. Therefore, a chance of entry of a foreign substance such as a spatter into the battery can be reduced.

The fitting section may define a through hole that penetrates the reverse plate. According to the sealed-type battery with such a configuration, the displacement of the welded position of the reverse plate with respect to the collector terminal can further effectively be prevented.

The reverse plate may include a dent section that has a recessed shape on a side where the reverse plate opposes the projected section and that has a projected shape on a side where the reverse plate opposes the hollow member. The fitting section may be configured to be the recessed shape defined by the dent section.

According to the sealed-type battery with such a configuration, the welding margin of the welded section in the thickness direction of the collector terminal can further easily be secured.

As it has been described so far, the disclosure can provide the sealed-type battery that includes the current interrupt device, suppresses the variations in the reverse pressure of the reverse plate, and reduces the chance of the entry of the foreign substance into the battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
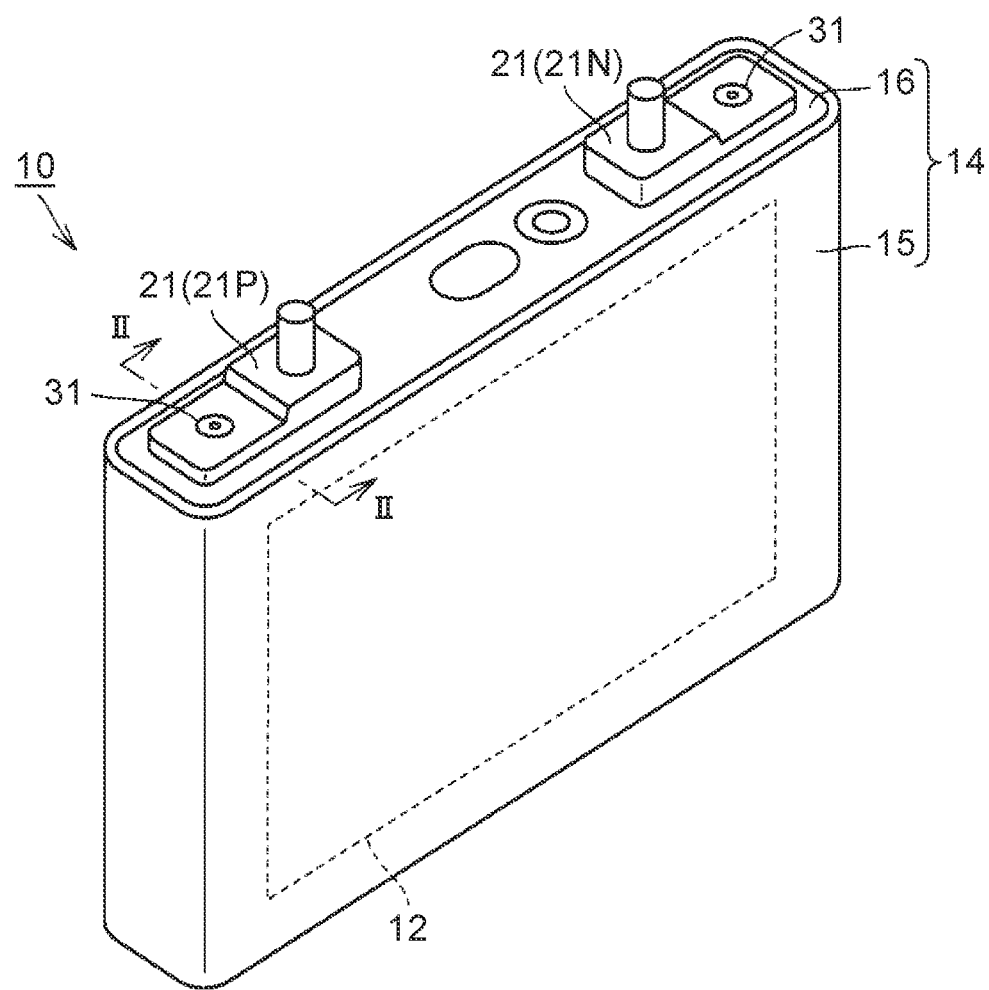
FIG. 1 is a perspective view, illustrating a sealed-type battery of a first embodiment according to the disclosure.

A description will be made on embodiments according to the disclosure with reference to the accompanying drawings. In the drawings which will be referred below, the same or corresponding members are denoted by the same reference numerals or symbols.

First Embodiment

Figure 2:
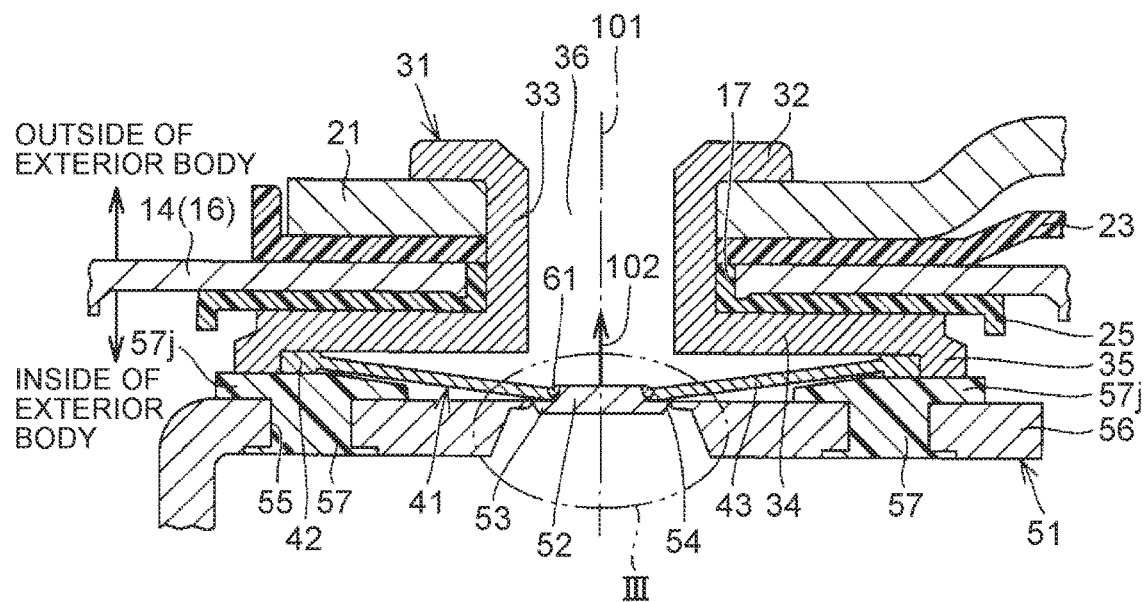
FIG. 2 is a cross-sectional view, illustrating the sealed-type battery, taken along line II-II in FIG. 1.

FIG. 1 is a perspective view, illustrating a sealed-type battery of a first embodiment according to the disclosure. FIG. 2 is a cross-sectional view, illustrating the sealed-type battery, taken along line II-II in FIG. 1.

With reference to FIG. 1 and FIG. 2, a sealed-type battery 10 in this embodiment is used to drive a vehicle and is mounted on a hybrid vehicle, a plug-in hybrid vehicle, an electric vehicle, or the like, for example. As power sources, the hybrid vehicle includes: an internal combustion engine such as a gasoline engine or a diesel engine; and a motor supplied with electricity from a rechargeable battery. The plug-in hybrid vehicle can be charged externally.

The sealed-type battery 10 has a battery element 12, an exterior body 14, a positive electrode terminal 21P, a negative electrode terminal 21N, and a collector terminal 51.

The battery element 12 is configured by stacking positive and negative electrodes via a separator. The exterior body 14 is configured by assembling a case 15 and a sealed body 16. The case 15 and the sealed body 16 are each formed of metal such as aluminum. The case 15 has a substantially rectangular-parallelepiped case shape that is opened in one direction, and accommodates an electrolyte solution and the battery element 12 therein. The sealed body 16 has a rectangular flat plate shape in a plan view and is provided to close an opening of the case 15. The sealed body 16 is welded to the case 15. A through hole 17 is provided in the sealed body 16.

On the outside of the exterior body 14, the positive electrode terminal 21P and the negative electrode terminal 21N are provided as external terminals 21 of the sealed-type battery 10.

The collector terminal 51 is provided in the exterior body 14. In the exterior body 14, the collector terminal 51 is connected to the battery element 12.

The sealed-type battery 10 includes a current interrupt device for interrupting a current flow between the battery element 12 and the external terminal 21 in the case where an internal pressure of the exterior body 14 is increased to be equal to or higher than a specified pressure. The current interrupt device is provided for at least one of the positive electrode terminal 21P and the negative electrode terminal 21N. A detailed description will hereinafter be made on a structure of the current interrupt device.

The sealed-type battery 10 further has an insulator 23, a gasket 25, a hollow rivet 31, a reverse plate 41, and plural resin holders 57.

The insulator 23 is disposed on the outside of the exterior body 14. The insulator 23 is placed on the sealed body 16 from the outside of the exterior body 14 in an overlapping manner. The insulator 23 is interposed between the sealed body 16 and the external terminal 21. The insulator 23 is formed of an insulating material and electrically insulates the sealed body 16 from the external terminal 21.

The hollow rivet 31 is formed of a conducting material. The hollow rivet 31 is provided as a hollow member that defines a hollow section 36. The hollow section 36 extends along a virtual center axis 101 and communicates with the outside (an external space) of the exterior body 14. The hollow rivet 31 is inserted through the through hole 17 provided in the sealed body 16. The hollow rivet 31 is connected to the external terminal 21 on the outside of the exterior body 14 and is connected to the reverse plate 41 on the inside of the exterior body 14. The hollow rivet 31 electrically connects the external terminal 21 and the reverse plate 41.

More specifically, the hollow rivet 31 has a tubular section 33, a first flange section 32, a second flange section 34, and an outer peripheral edge section 35 as components.

The tubular section 33 has a tubular shape that extends about the center axis 101. The tubular section 33 has a cylindrical shape. The tubular section 33 of the hollow rivet 31 is inserted through the through hole 17. The tubular section 33 is disposed in a manner to penetrate the insulator 23 and the external terminal 21 on the outside of the exterior body 14.

The first flange section 32 is located at an end of the tubular section 33 that extends in the tubular shape to the outside of the exterior body 14. The first flange section 32 has a flange shape that extends radially about the center axis 101 to the outside. The first flange section 32 is in contact with the external terminal 21. The insulator 23 and the external terminal 21 are interposed between the first flange section 32 and the sealed body 16.

The second flange section 34 is located at an end of the tubular section 33 that extends in the tubular shape to the inside of the exterior body 14 (the end of the tubular section 33 on an opposite side from the end thereof that is provided with the first flange section 32). The second flange section 34 has a flange shape that extends radially about the center axis 101 to the outside. The outer peripheral edge section 35 is located at an outer peripheral edge of the second flange section 34. The outer peripheral edge section 35 is provided in a manner to be folded from the outer peripheral edge of the second flange section 34 in a direction to approach the collector terminal 51 in the direction of the center axis 101. An outer peripheral edge section 42 of the reverse plate 41, which will be described below, is fitted to an inner side of the outer peripheral edge section 35.

The gasket 25 is interposed between the sealed body 16 and the hollow rivet 31. The gasket 25 is disposed as a seal member between the sealed body 16 and the hollow rivet 31.

Figure 3:
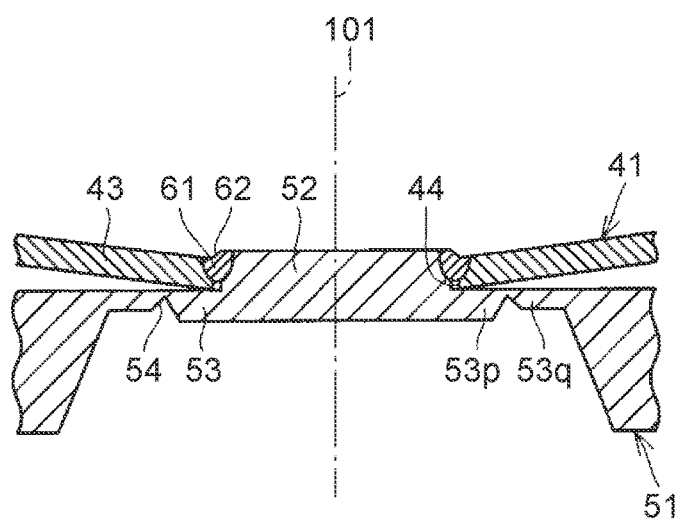
FIG. 3 is an enlarged, cross-sectional view, illustrating an area surrounded by two-dot chain line III in FIG. 2.
Figure 4:
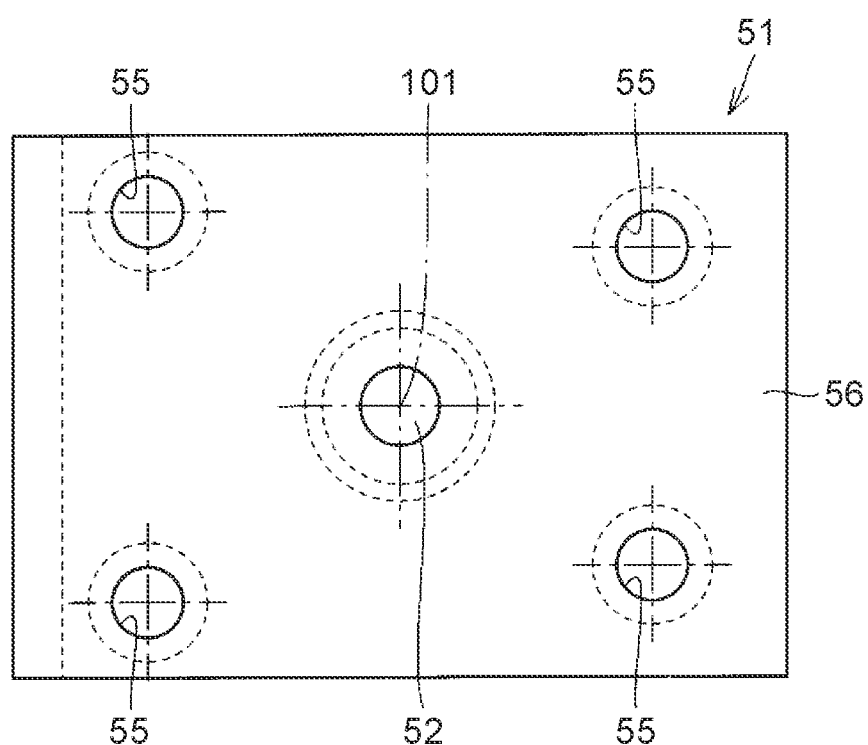
FIG. 4 is a plan view, illustrating a collector terminal in FIG. 2 solely.
Figure 5:
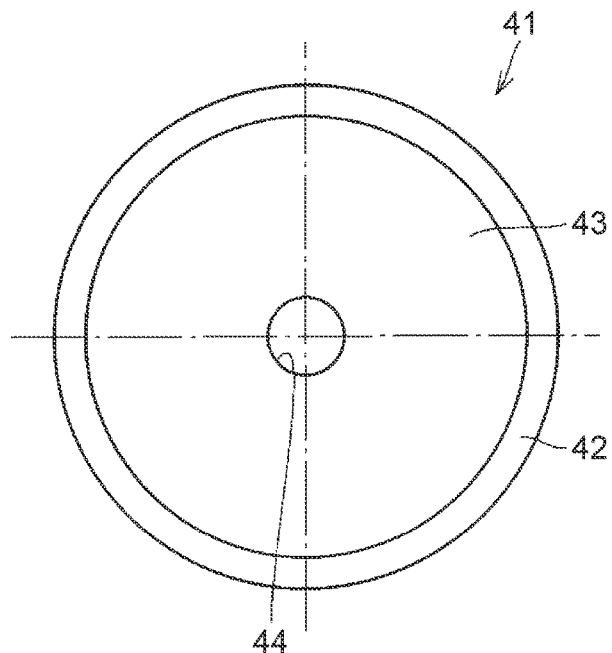
FIG. 5 is a plan view, illustrating a reverse plate in FIG. 2 solely.

FIG. 3 is an enlarged, cross-sectional view, illustrating an area surrounded by two-dot chain line III in FIG. 2. FIG. 4 is a plan view, illustrating the collector terminal in FIG. 2 solely. FIG. 5 is a plan view, showing the reverse plate in FIG. 2 solely.

With reference to FIG. 1 to FIG. 5, the reverse plate 41 is formed of the conducting material. In the axial direction of the center axis 101, the reverse plate 41 is arranged between the hollow rivet 31 (the second flange section 34) and the collector terminal 51. The reverse plate 41 is connected to the hollow rivet 31 and the collector terminal 51. The reverse plate 41 electrically connects the hollow rivet 31 and the collector terminal 51.

The reverse plate 41 is formed of a circular thin plate in the plan view. The reverse plate 41 is provided such that a center of a circle thereof in the plan view overlaps the center axis 101. As a whole, the reverse plate 41 has a shape of being recessed on a side that opposes the hollow rivet 31 in the axial direction of the center axis 101 and being projected on a side that opposes the collector terminal 51 in the axial direction of the center axis 101.

The reverse plate 41 has a slant section 43 and the outer peripheral edge section 42 as components. The slant section 43 has a shape of slanting in a direction to approach the hollow rivet 31 from the collector terminal 51 in the axial direction of the center axis 101 and extending radially to the outside from the inside in a radial direction of the center axis 101. The outer peripheral edge section 42 is provided at an outer peripheral edge of the slant section 43. The outer peripheral edge section 42 has a ring shape that has constant thickness in the axial direction of the center axis 101 and that circles around the center axis 101.

A fitting section 44 is provided in the reverse plate 41. The fitting section 44 is located at an inner peripheral edge of the slant section 43. In this embodiment, the fitting section 44 is provided as a through hole that penetrates the reverse plate 41 in the axial direction of the center axis 101. The fitting section 44 has a circular opening shape with the center axis 101 being the center. The fitting section 44 is provided in a manner to oppose the hollow rivet 31 (the hollow section 36) in the axial direction of the center axis 101.

The collector terminal 51 has a plate-shaped section 56 as a component. The plate-shaped section 56 has a plate shape. The plate-shaped section 56 is arranged in a manner to oppose the hollow rivet 31 (the second flange section 34 and the outer peripheral edge section 35) in the axial direction of the center axis 101.

Plural through holes 55 are formed in the plate-shaped section 56. The plural resin holders 57 are respectively attached to the plural through holes 55. Each of the resin holders 57 has a base section 57$j$ as a component. The base section 57$j$ is disposed in a manner to be projected toward the hollow rivet 31 from the plate-shaped section 56. The outer peripheral edge section 42 of the reverse plate 41 and the outer peripheral edge section 35 of the hollow rivet 31 are placed on the base section 57$j$.

The collector terminal 51 (the plate-shaped section 56) has a projected section 52, a peripheral edge section 53, and a notch section 54 as the components.

The projected section 52 is disposed in a manner to be projected toward the hollow rivet 31 (the hollow section 36). The projected section 52 has a projected shape that is projected in the axial direction of the center axis 101 with the peripheral edge section 53 being a reference. When seen in the axial direction of the center axis 101, the projected section 52 is circular in the plan view. The projected section 52 is fitted to the fitting section 44 of the reverse plate 41.

The peripheral edge section 53 is provided along a peripheral edge of the projected section 52. When seen in the axial direction of the center axis 101, the peripheral edge section 53 is provided in a region that circles around the projected section 52. In the case where length of the collector terminal 51 in a projected direction of the projected section 52, that is, in the axial direction of the center axis 101 is referred to as thickness, the projected section 52 is thicker than the peripheral edge section 53.

The peripheral edge section 53 has a thick section 53$p$ and a thin section 53$q$ as components. The thick section 53$p$ is provided along the peripheral edge of the projected section 52. The thin section 53$q$ is provided along a peripheral edge of the thick section 53$p$. The peripheral edge section 53 has such a step structure that the thin section 53$q$ is thinner than the thick section 53$p$.

The notch section 54 is provided in a manner to surround the projected section 52. When seen in the axial direction of the center axis 101, the notch section 54 is provided on an outer periphery of the projected section 52. The notch section 54 is disposed in the peripheral edge section 53. The notch section 54 is disposed in the peripheral edge section 53 in a manner to reduce the thickness of the collector terminal 51. The notch section 54 is disposed on an opposite side from the side where the collector terminal 51 opposes the reverse plate 41 in the axial direction of the center axis 101. The notch section 54 is provided on a boundary between the thick section 53$p$ and the thin section 53$q$ in the peripheral edge section 53.

The sealed-type battery 10 further has a welded section 61. The welded section 61 joins the collector terminal 51 and the reverse plate 41 at a position between the projected section 52 and the fitting section 44. The welded section 61 is provided by welding the collector terminal 51 and the reverse plate 41 to each other. More specifically, the welded section 61 is a portion in which the collector terminal 51 and the reverse plate 41 are melted by laser welding, are solidified thereafter, and are thereby integrated with each other.

The welded section 61 is provided in a portion in which the projected section 52 and the fitting section 44 abut each other in the radial direction of the center axis 101. The welded section 61 has a top surface 62. The top surface 62 opposes the hollow rivet 31 (the hollow section 36) in the axial direction of the center axis 101. In the axial direction of the center axis 101, the welded section 61 is provided across specified depth of the collector terminal 51 and the reverse plate 41 from the top surface 62.

As described above, an outer side of the reverse plate 41 in the radial direction of the center axis 101 is connected to the hollow rivet 31, and an inner side of the reverse plate 41 in the radial direction of the center axis 101 is connected to the collector terminal 51. In this way, a sealed space that accommodates the battery element 12 and the electrolyte solution is formed in the exterior body 14. When the internal pressure of the exterior body 14 is increased, as indicated by an arrow 102 in FIG. 2, the reverse plate 41 is deformed in the direction to approach the hollow rivet 31. At this time, the collector terminal 51 is fractured from the notch section 54 as a point of origin, and the current flow between the battery element 12 and the external terminal 21 is thereby interrupted.

Figure 6:
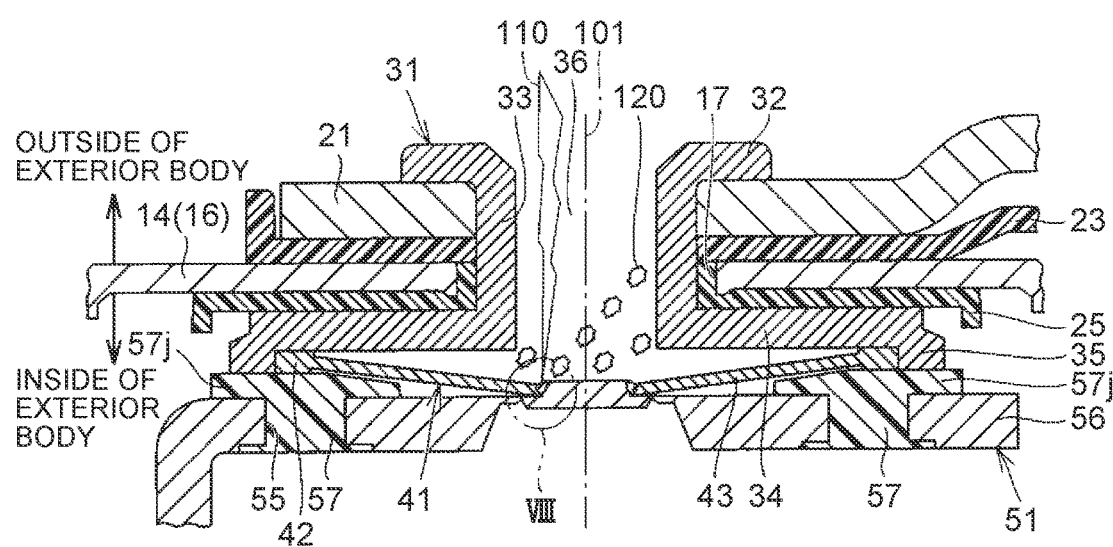
FIG. 6 is a cross-sectional view, illustrating a welding process of the collector terminal and the reverse plate in a manufacturing method of the sealed-type battery in FIG. 1.

FIG. 6 is a cross-sectional view, illustrating a welding process of the collector terminal and the reverse plate in a manufacturing method of the sealed-type battery in FIG. 1.

With reference to FIG. 6, in the manufacturing method of the sealed-type battery 10, first, the insulator 23, the external terminals 21, the gasket 25, the hollow rivet 31, and the reverse plate 41 are assembled to the sealed body 16. At this time, a tip of the hollow rivet 31 that is projected to the outside of the exterior body 14 is caulked. In this way, the insulator 23, the external terminals 21, and the gasket 25 are fixed to the sealed body 16.

The collector terminal 51 is joined to the battery element 12 by welding. Next, the projected section 52 of the collector terminal 51 is fitted to the fitting section 44 of the reverse plate 41. The portion in which the projected section 52 and the fitting section 44 abut each other through the hollow section 36 is irradiated with a laser beam 110 (butt welding). In this way, the reverse plate 41 and the collector terminal 51 are joined to each other.

Next, an assembly that is obtained by the above welding process is arranged in the case 15, and the sealed body 16 is welded to the case 15. The electrolyte solution is poured into the case 15 through a solution pouring port provided in the sealed body 16, and the solution pouring port is thereafter closed. The sealed-type battery 10 in FIG. 1 is completed by the processes described so far.

Next, a description will be made on an operational effect exerted by the sealed-type battery 10 in FIG. 1 with a possibility of a sealed-type battery in a comparative example.

Figure 7:
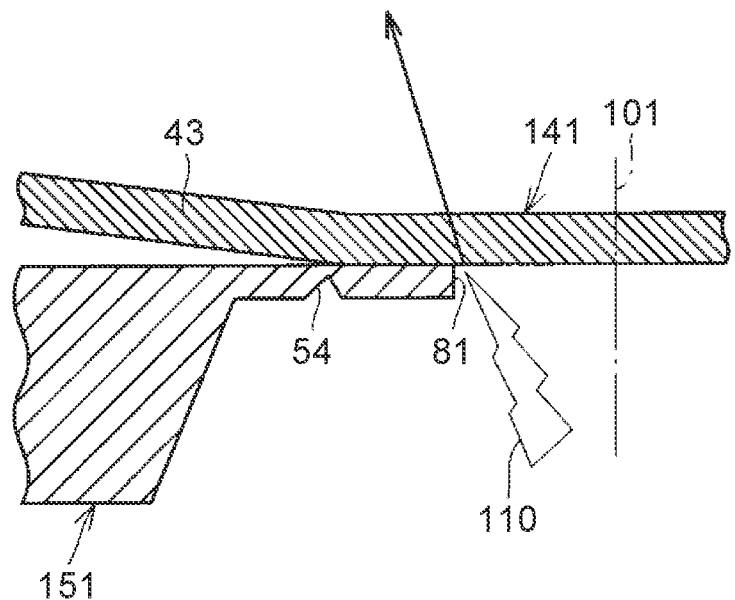
FIG. 7 is a cross-sectional view, illustrating a welding process of a collector terminal and a reverse plate in a manufacturing method of a sealed-type battery in a comparative example.

FIG. 7 is a cross-sectional view, illustrating a welding process of a collector terminal and a reverse plate in a manufacturing method of the sealed-type battery in the comparative example. With reference to FIG. 7, the sealed-type battery in this comparative example has a reverse plate 141 and a collector terminal 151 instead of the reverse plate 41 and the collector terminal 51 in the sealed-type battery 10.

The reverse plate 141 is not provided with the fitting section 44 in the reverse plate 41. That is, the reverse plate 41 has such a shape that a central section thereof crossing the center axis 101 is closed. A through hole 81 is provided in the collector terminal 151. The through hole 81 has a circular opening shape with the center axis 101 being the center. In the manufacturing method of the sealed-type battery with such a configuration in the comparative example, a corner defined by the reverse plate 141 and an inner wall of the collector terminal 151 which defines the through hole 81 is irradiated with a laser beam (fillet welding). In this way, the reverse plate 141 and the collector terminal 151 are welded to each other.

In general, the reverse plate 141 has extremely small thickness (for example, 0.3 mm). When the fillet welding of the collector terminal 151 is performed with respect to such a thin reverse plate 141 (with low thermal capacity), the laser beam possibly penetrates the reverse plate 141, or a thermal effect of welding heat on the reverse plate 141 possibly becomes significant. As a result, a reverse pressure of the reverse plate 141 possibly varies.

In addition, in a configuration of mutually positioning the reverse plate 141 and the collector terminal 151 via the resin holders 57 in FIG. 2, displacement between the reverse plate 141 and the collector terminal 151 (misalignment between the through hole 81 and the reverse plate 141) possibly occurs during the above welding process, and the reverse pressure of the reverse plate 141 possibly varies.

Furthermore, because the corner is irradiated with the laser beam from the inside of the exterior body 14 during the above welding process, a foreign substance such as a spatter is possibly adhered to a part accommodated in the battery.

Due to the reasons as described above, in the sealed-type battery in the comparative example, it is difficult to obtain consistent robustness of a joined section between the reverse plate 141 and the collector terminal 151 and to sufficiently reduce a chance of entry of the foreign substance into the battery.

Figure 8:
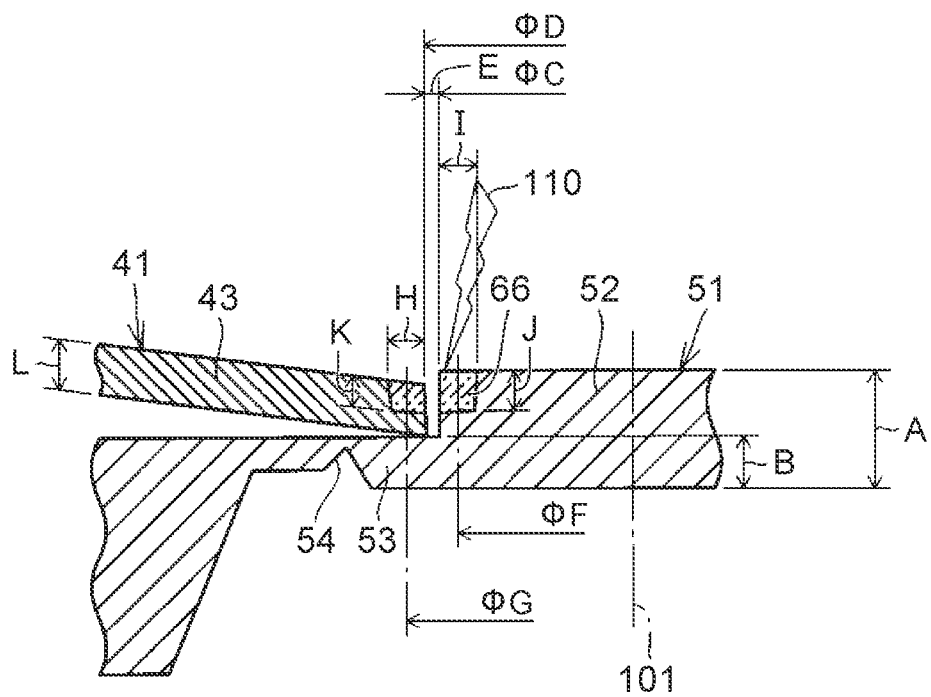
FIG. 8 is an enlarged, cross-sectional view, illustrating an area surrounded by two-dot chain line VIII in FIG. 6.
Figure 9:
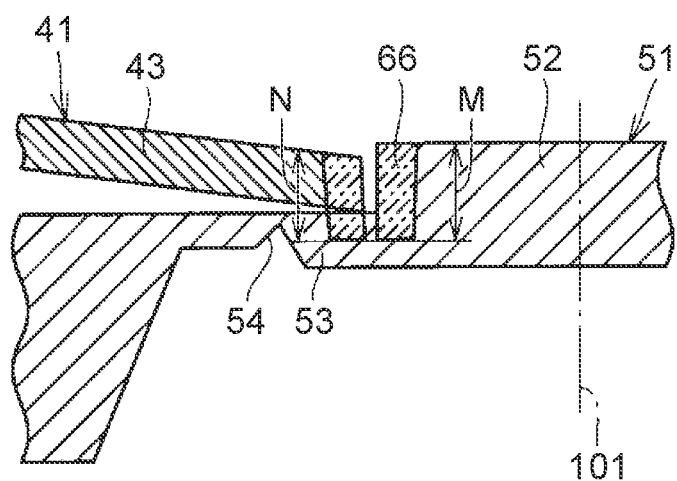
FIG. 9 is an enlarged cross-sectional view, illustrating the area surrounded by the two-dot chain line VIII in FIG. 6.

FIG. 8 and FIG. 9 are cross-sectional views in each of which an area surrounded by two-dot chain line VIII in FIG. 6 is enlarged. FIG. 8 illustrates a case where a minimum amount of weld penetration of the reverse plate 41 and the collector terminal 51 is obtained during welding of the reverse plate 41 and the collector terminal 51, and FIG. 9 illustrates a case where the amount of the weld penetration of the reverse plate 41 and the collector terminal 51 is increased.

With reference to FIG. 6, FIG. 8, and FIG. 9, in the sealed-type battery 10 in this embodiment, butt welding between the projected section 52 and the fitting section 44 can be performed, and a welding margin of the welded section 61 in a thickness direction can easily be secured. Thus, it is possible to prevent the penetration of the laser beam and the excessive thermal effect of the welding heat on the reverse plate 41. In addition, because the projected section 52 is fitted to the fitting section 44, the reverse plate 41 and the collector terminal 51 are mutually positioned with a high degree of accuracy. Therefore, the variations in the reverse pressure of the reverse plate 41 due to the welding process of the collector terminal 51 and the reverse plate 41 can be suppressed.

In the sealed-type battery 10 in this embodiment, the portion in which the projected section 52 and the fitting section 44 abut each other is irradiated with the laser beam 110 from the outside of the exterior body 14, and the reverse plate 41 and the collector terminal 51 are thereby welded to each other. In this way, the chance of the entry of the foreign substance such as the spatter 120, which is produced during the welding process, into the battery can sufficiently be reduced.

One example of dimensions of the components of the sealed-type battery 10 shown in FIG. 8 and FIG. 9 is as follows: thickness A of the projected section 52=1.0 mm, thickness B of the peripheral edge section 53 (the thick section 53p)=0.5 mm, a diameter 4C of the projected section 52=2.0 mm, a diameter ϕD of the fitting section 44=2.2 mm, width E of a gap between the projected section 52 and the fitting section 44=0.1 mm, a central position ϕF of a melted section 66 in the collector terminal 51=1.8 mm, a central position ϕG of the melted section 66 in the reverse plate 41=2.4 mm, width H of the melted section 66 in the reverse plate 41=0.4 mm, width I of the melted section 66 in the collector terminal 51=0.4 mm, depth J (FIG. 8) of the melted section 66 in the collector terminal 51=0.3 mm, depth K (FIG. 8) of the melted section 66 in the reverse plate 41=0.1 mm, thickness L of the reverse plate 41=0.3 mm, a diameter of the hollow section 36 (an opening during welding)=5 mm, depth M (FIG. 9) of the melted section 66 in the collector terminal 51=0.6 mm, and depth N (FIG. 9) of the melted section 66 in the reverse plate 41=0.4 mm. Under the above dimensional conditions, the amount of the weld penetration of the reverse plate 41 and the collector terminal 51 in FIG. 8 is 0.9 mm$^3$, and the amount of the weld penetration of the reverse plate 41 and the collector terminal 51 in FIG. 9 is 2.58 mm$^3$. In this case, the welding margin of the welded section 61 in the thickness direction that is approximately 2.5 times or larger than that in FIG. 8 can be secured.

The structure of the sealed-type battery 10 in the first embodiment according to the disclosure, which has been described so far, will be summarized. The sealed-type battery 10 in this embodiment is the sealed-type battery that includes the current interrupt device. The sealed-type battery 10 includes: the exterior body 14 accommodating the battery element 12; the collector terminal 51 connected to the battery element 12 in the exterior body 14; the hollow rivet 31 as the hollow member defining the hollow section 36 that communicates with the outside of the exterior body 14; and the reverse plate 41 arranged between the collector terminal 51 and the hollow rivet 31, deformed at the time when the internal pressure of the exterior body 14 is increased to be equal to or higher than the specified pressure, and thereby interrupting the current flow between the battery element 12 and the external terminal 21 provided on the outside of the exterior body 14. The collector terminal 51 includes: the projected section 52 projected toward the hollow rivet 31; the peripheral edge section 53 provided along the peripheral edge of the projected section 52; and the notch section 54 provided in the peripheral edge section 53 in the manner to surround the projected section 52 and formed in a manner to reduce the thickness of the collector terminal 51 in the projected direction of the projected section 52. In the projected direction of the projected section 52, the projected section 52 is thicker than the peripheral edge section 53. The fitting section 44, to which the projected section 52 is fitted, is provided in the reverse plate 41. The sealed-type battery 10 includes the welded section 61 that has the top surface 62 opposing the hollow rivet 31 and that joins the collector terminal 51 and the reverse plate 41 at the position between the projected section 52 and the fitting section 44.

According to the sealed-type battery 10 with such a configuration in the first embodiment according to the disclosure, the variations in the reverse pressure of the reverse plate 41 can be suppressed, and the chance of the entry of the foreign substance into the battery can be reduced.

Second Embodiment

Figure 10:
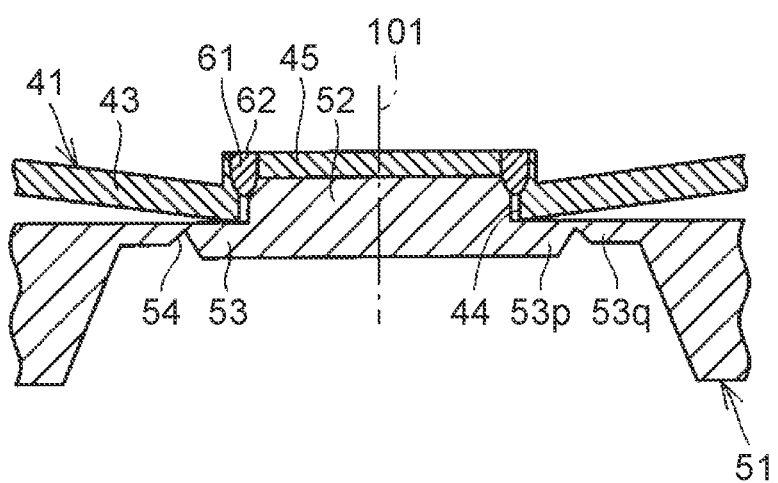
FIG. 10 is a cross-sectional view, illustrating a sealed-type battery of a second embodiment according to the disclosure.

FIG. 10 is a cross-sectional view, illustrating a sealed-type battery of a second embodiment according to the disclosure. FIG. 10 is a view that corresponds to FIG. 3 in the first embodiment. Compared to the sealed-type battery 10 in the first embodiment, the sealed-type battery in this embodiment basically has a similar structure. Hereinafter, the overlapping structure will not be described.

With reference to FIG. 10, in this embodiment, a reverse plate 41 further has a dent section 45. The dent section 45 is provided on a radially inner side of the slant section 43. The dent section 45 has a recessed shape on a side where the reverse plate 41 opposes the projected section 52, and has a projected shape on a side where the reverse plate 41 opposes the hollow rivet 31. The dent section 45 has a bottomed cylindrical shape. The fitting section 44 is configured to be the recessed shape defined by the dent section 45.

The welded section 61 has the top surface 62 in the dent section 45. In the axial direction of the center axis 101, the welded section 61 is provided from a bottom portion of the dent section 45 in such depth as to reach the projected section 52.

Figure 11:
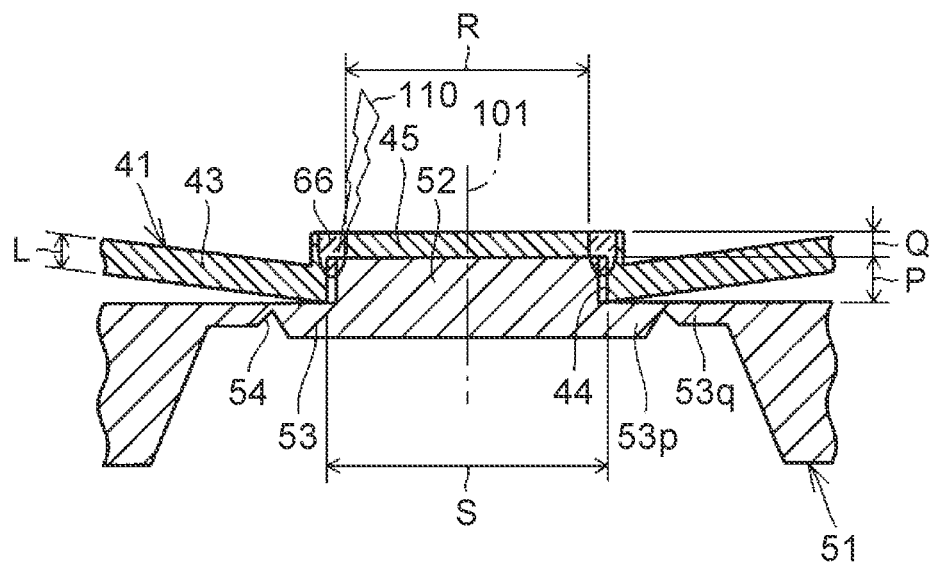
FIG. 11 is a cross-sectional view, illustrating a welding process of a collector terminal and a reverse plate in a manufacturing method of the sealed-type battery in FIG. 10.

FIG. 11 is a cross-sectional view, illustrating a welding process of the collector terminal and the reverse plate in a manufacturing method of the sealed-type battery in FIG. 10. With reference to FIG. 11, the bottom portion of the dent section 45 is irradiated with the laser beam 110 through the hollow section 36. In this way, also in this embodiment, the reverse plate 41 and the collector terminal 51 are joined to each other.

One example of dimensions of the components of the sealed-type battery shown in FIG. 11 is as follows: depth P of the fitting section 44=0.5 mm, thickness Q of the bottom portion of the dent section 45=0.3 mm, a diameter ϕR of the projected section 52=2.0 mm, and a diameter ϕS of the fitting section 44=2.2 mm. According to the sealed-type battery with such a configuration in the second embodiment of the disclosure, the effects described in the first embodiment can be exerted similarly. In addition, the welding margin of the welded section 61 in the thickness direction can further easily be secured.

It should be understood that the embodiments disclosed herein are illustrative in all respects and not restrictive. The scope of the disclosure is defined by the claims rather than the above description, and intends to include all modifications falling within the claims and equivalents thereof.

The disclosure is primarily applied to the sealed-type battery that includes the current interrupt device.

What is claimed is:

1. A sealed-type battery including a current interrupt device, the sealed-type battery comprising:
    an exterior body accommodating a battery element;
    a collector terminal inside of the exterior body and connected to the battery element, wherein the collector terminal includes a projected section at a center thereof;
    a hollow member defining a hollow section that communicates with outside of the exterior body;
    a reverse plate arranged between the collector terminal and the hollow member, deformed at a time when an internal pressure of the exterior body is increased to be equal to or higher than a specified pressure to interrupt a current flow between the battery element and an external terminal provided on the outside of the exterior body, wherein the reverse plate includes a fitting section at a center thereof, which overlaps with a center axis of the hollow member; and a welded section having a top surface opposing the hollow member, the welded section joining the collector terminal and the reverse plate at a position between the projected section of the collector terminal and the fitting section of the reverse plate, wherein the collector terminal includes:

the projected section projected toward the hollow member;

a peripheral edge section provided along a peripheral edge of the projected section; and a notch section provided in the peripheral edge section in a manner to surround the projected section and formed in a manner to reduce thickness of the collector terminal in a projected direction of the projected section, and the projected section is thicker than the peripheral edge section in the projected direction of the projected section, and the projected section is fitted in the fitting section of the reverse plate.

2. The sealed-type battery according to claim 1, wherein the fitting section defines a through hole that penetrates the reverse plate.

3. The sealed-type battery according to claim 1, wherein the reverse plate includes a dent section that has a recessed shape on a side where the reverse plate opposes the projected section and that has a projected shape on a side where the reverse plate opposes the hollow member, and the fitting section is configured to be the recessed shape defined by the dent section.

* * * * *